US012597627B2

(12) United States Patent
Zhao et al.

(10) Patent No.: US 12,597,627 B2
(45) Date of Patent: *Apr. 7, 2026

(54) WINDING DEVICE

(71) Applicant: Wuxi Lead Intelligent Equipment Co., Ltd., Wuxi (CN)

(72) Inventors: Liujie Zhao, Jiangsu (CN); Fengjie Wang, Jiangsu (CN)

(73) Assignee: Wuxi Intelligent Equipment Co. Ltd., Wuxi (CN)

( * ) Notice: Subject to any disclaimer, the term of this patent is extended or adjusted under 35 U.S.C. 154(b) by 397 days.

This patent is subject to a terminal disclaimer.

(21) Appl. No.: 18/210,308

(22) Filed: Jun. 15, 2023

(65) Prior Publication Data

US 2023/0327174 A1 Oct. 12, 2023

Related U.S. Application Data

(63) Continuation of application No. PCT/CN2022/130620, filed on Nov. 8, 2022.

(51) Int. Cl.
| | |
|---|---|
| *H01M 10/04* | (2006.01) |
| *B65H 18/02* | (2006.01) |
| *B65H 18/08* | (2006.01) |
| *B65H 19/22* | (2006.01) |
| *B65H 35/00* | (2006.01) |

(52) U.S. Cl.
CPC .... *H01M 10/0409* (2013.01); *B65H 18/0212* (2020.08); *B65H 18/085* (2013.01); *B65H 19/2223* (2013.01); *B65H 35/0006* (2013.01); *B65H 2404/10* (2013.01); *B65H 2701/19* (2013.01)

(58) Field of Classification Search
CPC ........... B65H 18/0212; B65H 19/2223; H01M 10/0409; H01M 10/0587
See application file for complete search history.

(56) References Cited

U.S. PATENT DOCUMENTS

| | | | | |
|---|---|---|---|---|
| 11,949,059 B2* | 4/2024 | Wu | ................... | H01M 10/0431 |
| 2022/0393222 A1* | 12/2022 | Kim | ................... | B65H 23/0204 |

FOREIGN PATENT DOCUMENTS

| | | | | |
|---|---|---|---|---|
| CN | 103985894 A | * | 8/2014 | ........ H01M 10/0587 |
| CN | 112467229 A | | 3/2021 | |
| CN | 113422100 A | | 9/2021 | |

(Continued)

OTHER PUBLICATIONS

English translation of JP2014038784 (Year: 2014).*
English translation of CN103985894 (Year: 2013).*

*Primary Examiner* — Scott W Dodds
(74) *Attorney, Agent, or Firm* — Baker Botts LLP

(57) ABSTRACT

A winding device including: a merging equipment, for merging a passing first diaphragm, a passing cathode pole piece, a passing second diaphragm and a passing anode pole piece to form a combined material strip; a first pole-piece-processing equipment, for cutting off the passing cathode pole piece, separating from each other a first upstream cut-off end and a first downstream cut-off end, and connecting them with a tape; a winding equipment, including a turret and at least two winding needles, the turret driving each of the winding needles to pass by a first station and a second station sequentially; and a guiding roller and a cutting-off equipment.

19 Claims, 6 Drawing Sheets

(56)       References Cited

FOREIGN PATENT DOCUMENTS

| | | | | |
|---|---|---|---|---|
| CN | 216750028 | U | 6/2022 | |
| CN | 216750029 | U | 6/2022 | |
| JP | 2014038784 | A  * | 2/2014 | ........ H01M 10/0587 |
| JP | 2014154457 | A | 8/2014 | |
| JP | 5908142 | B1 | 4/2016 | |

* cited by examiner d4 f                    f d3 d4 f3 f1 f2 d3

WINDING DEVICE

CROSS-REFERENCE TO RELATED APPLICATIONS

This application is a National Stage of International Application No. PCT/CN2022/130620, filed on Nov. 8, 2022, which claims priority to Chinese Patent Application No. 202122777122.X, filed on Nov. 12, 2021, both of which are hereby incorporated by reference in their entireties.

TECHNICAL FIELD

The present disclosure relates to the field of battery manufacturing device, and specifically, to a winding device.

BACKGROUND

A cell is an important part of a lithium-ion battery, which is generally formed by a winding of four layers of material strips including a diaphragm, a cathode pole piece, another diaphragm and an anode pole piece. However, the existing winding device cannot implement continuous winding: every time a cell is wound, two pole piece feeding equipment are required to insert respectively the anode pole piece and the cathode pole piece into the needle-winding mechanism. This seriously affects the winding efficiency of the cell, since it takes a long time for the insertion of the anode pole piece and the cathode pole piece.

SUMMARY

Based on this, it is necessary to provide a winding device to address the above defect in view of the problem that the winding efficiency of the cell is seriously affected since it takes a long time for the insertion of the anode pole piece and the cathode pole piece every time a cell is wound by a prior art winding device.

A winding device includes:

a first unwinding equipment, a second unwinding equipment, a third unwinding equipment and a fourth unwinding equipment, respectively configured for outputting a first diaphragm, a cathode pole piece, a second diaphragm and an anode pole piece;

a merging equipment, arranged downstream of the first unwinding equipment, the second unwinding equipment, the third unwinding equipment and the fourth unwinding equipment, and configured for merging a passing first diaphragm, a passing cathode pole piece, a passing second diaphragm and a passing anode pole piece so as to form a combined material strip;

a first pole-piece-processing equipment, arranged between the second unwinding equipment and the merging equipment, configured for cutting off the passing cathode pole piece, separating from each other a first upstream cut-off end and a first downstream cut-off end both formed upon cut-off of the cathode pole piece, and connecting the first upstream cut-off end and the first downstream cut-off end with a tape; the tape between the first upstream cut-off end and the first downstream cut-off end forming a first tape portion;

a winding equipment, including a turret and at least two winding needles mounted on the turret, the turret rotatably provided so as to drive each of the winding needles to pass by a first station and a second station sequentially, and the first station located downstream of the merging equipment; and a guiding roller and a cutting-off equipment, both arranged between the first station and the second station, the cutting-off equipment configured for cutting off the passing first diaphragm, the first tape portion on the passing cathode pole piece, the passing second diaphragm and the passing anode pole piece in one time;

wherein, when the winding needle located at the first station rotates to the second station along with the turret, the other winding needle rotates to the first station, and the combined material strip located between the first station and the second station winds through the guiding roller; guidance of the guiding roller enabling the winding needle located at the first station to hold the combined material strip passing by the first station.

In one of the embodiments, the first pole-piece-processing equipment includes from upstream to downstream a first holding-transporting assembly, a first cutting assembly, a first gluing assembly and a second holding-transporting assembly disposed sequentially;

both the first holding-transporting assembly and the second holding-transporting assembly are configured for holding the passing cathode pole piece and can move downstream, the first cutting assembly being configured for cutting off the passing cathode pole piece, and the cut off cathode pole piece forming a first upstream cut-off end and a first downstream cut-off end;

wherein, during downstream moving, the first holding-transporting assembly and the second holding-transporting assembly can drive the first upstream cut-off end and the first downstream cut-off end respectively to move to the first gluing assembly and be separated from each other, and the first gluing assembly is configured for bonding the first upstream cut-off end to the first downstream cut-off end with a tape.

In one of the embodiments, when the first holding-transporting assembly and the second holding-transporting assembly drive the first upstream cut-off end and the first downstream cut-off end respectively to move to the first gluing assembly, the second holding-transporting assembly moves a distance greater than that the first holding-transporting assembly moves.

In one of the embodiments, the first gluing assembly is configured for bonding the first upstream cut-off end to the first downstream cut-off end with the tape from one side of the cathode pole piece.

In one of the embodiments, the first gluing assembly is configured for bonding the first upstream cut-off end to the first downstream cut-off end with two tapes from two sides of the cathode pole piece respectively.

In one of the embodiments, the tape includes a first tape, a second tape and a third tape, the first gluing assembly is configured for bonding the first upstream cut-off end to the first downstream cut-off end with the first tape from a first side of the cathode pole piece, bonding the first upstream cut-off end to the first tape with the second tape from a second side of the cathode pole piece, and bonding the first downstream cut-off end to the first tape with the third tape from the second side of the cathode pole piece.

In one of the embodiments, the winding device further includes a second pole-piece-processing equipment arranged between the merging equipment and the fourth unwinding equipment, the second pole-piece-processing equipment is configured for cutting off the passing anode pole piece, separating from each other a second upstream cut-off end and a second downstream cut-off end both formed upon cut-off of the anode pole piece, and connecting the second upstream cut-off end and the second downstream cut-off end by the tape; the tape between the second upstream cut-off end and the second downstream cut-off end forms a second tape portion;

the cutting-off equipment is configured for cutting off the passing first diaphragm, the first tape portion on the passing cathode pole piece, the passing second diaphragm, and a second tape portion on the passing anode pole piece in one time.

In one of the embodiments, the second pole-piece-processing equipment includes from upstream to downstream a third holding-transporting assembly, a second cutting assembly, a second gluing assembly and a fourth holding-transporting assembly disposed sequentially;

both the third holding-transporting assembly and the fourth holding-transporting assembly are configured for holding the passing anode pole piece and can move downstream, the second cutting assembly being configured for cutting off the passing anode pole piece, and the cut off anode pole piece forming the second upstream cut-off end and the second downstream cut-off end;

wherein, during downstream moving, the third holding-transporting assembly and the fourth holding-transporting assembly can drive the second upstream cut-off end and the second downstream cut-off end respectively to move to the second gluing assembly and be separated from each other, and the second gluing assembly is configured for bonding the second upstream cut-off end to the second downstream cut-off end with the tape.

In one of the embodiments, when the third holding-transporting assembly and the fourth holding-transporting assembly drive the second upstream cut-off end and the second downstream cut-off end respectively to move to the second gluing assembly, the fourth holding-transporting assembly moves a distance greater than that the third holding-transporting assembly moves.

In one of the embodiments, the second gluing assembly is configured for bonding the second upstream cut-off end to the second downstream cut-off end with the tape from one side of the anode pole piece.

In one of the embodiments, the second gluing assembly is configured for bonding the second upstream cut-off end to the second downstream cut-off end with two tapes from two sides of the anode pole piece respectively.

In one of the embodiments, the tape includes a first tape, a second tape and a third tape, the second gluing assembly is configured for bonding the second upstream cut-off end to the second downstream cut-off end with the first tape from a first side of the cathode pole piece, bonding the second upstream cut-off end to the first tape with the second tape from a second side of the cathode pole piece, and bonding the second downstream cut-off end to the first tape with the third tape from the second side of the cathode pole piece.

In one of the embodiments, the winding device further includes a first feeding equipment arranged between the merging equipment and the first pole-piece-processing equipment;

the first feeding equipment includes a first feeding assembly having two first feeding rollers provided oppositely, the two first feeding rollers forming a first feeding passage therebetween for the cathode pole piece to pass through, and at least one of the two first feeding rollers can be controlled to get close to or away from the other one and each can rotate around its own axis.

In one of the embodiments, both of the two first feeding rollers can be controlled to move along their own axes so as to drive the cathode pole piece clamped by the two first feeding rollers for alignment.

In one of the embodiments, the first feeding equipment further includes a first holding assembly arranged upstream of the first feeding assembly, and a first cut-off assembly arranged between the first holding assembly and the first feeding assembly; the first holding assembly is configured for clamping or releasing the passing cathode pole piece and can be controlled to get close to or away from the first cut-off assembly, and the first cut-off assembly is configured for cutting off the passing cathode pole piece.

In one of the embodiments, the winding device further includes a second feeding equipment arranged between the merging equipment and the fourth unwinding equipment;

the second feeding equipment includes a second feeding assembly having two second feeding rollers provided oppositely, the two second feeding rollers forming a second feeding passage therebetween for the anode pole piece to pass through, and at least one of the two second feeding rollers can be controlled to get close to or away from the other one and each can rotate around its own axis.

In one of the embodiments, both of the two second feeding rollers can be controlled to move along their own axes so as to drive the anode pole piece clamped by the two second feeding rollers for alignment.

In one of the embodiments, the second feeding equipment further includes a second holding assembly arranged upstream of the second feeding assembly, and a second cut-off assembly arranged between the second holding assembly and the second feeding assembly;

the second holding assembly is configured for clamping or releasing the passing anode pole piece and can be controlled to get close to or away from the second cut-off assembly, and the second cut-off assembly is configured for cutting off the passing anode pole piece.

In one of the embodiments, the merging equipment has a first merging roller and a second merging roller arranged oppositely, the first merging roller and the second merging roller forming a merging passage therebetween for the first diaphragm, the cathode pole piece, the second diaphragm and the anode pole piece to pass through; at least one of the first merging roller and the second merging roller can be controlled to get close to or away from the other one, and each can rotate around its own axis.

In one of the embodiments, the turret is mounted with three winding needles disposed at intervals in a rotating direction of the turret; the winding equipment further has a third station, and during rotating along with the turret, the three winding needles pass by the first station, the second station and the third station sequentially; when one of the winding needles is located at the first station, the other two winding needles are respectively located at the second station and the third station;

there are provided three guiding rollers, and there are provided with the guiding roller between each adjacent two winding needles.

The first diaphragm, the cathode pole piece, the second diaphragm and the anode pole piece unwound and output respectively by the above winding device, the first unwinding equipment, the second unwinding equipment, the third unwinding equipment and the fourth unwinding equipment are merged by the merging equipment to form the combined material strip, and the combined material strip formed upon mergence reaches the winding needle at the first station. The winding needle at the first station revolves on its axis to wind the combined material strip to form a cell.

When the winding of a cell is completed, the winding needle at the first station stops revolving on its axis and rotates along with the turret to the second station, while the other winding needle rotates along with the turret to the first station. At this time, due to the rotation of the turret, the combined material strip located between the first station and the second station winds around the guiding roller, and under the guidance of the guiding roller, the combined material strip passing by the first station is aligned with the slit of the winding needle at the first station. By controlling the extension of the winding needle at the first station, the combined material strip passing by the first station enters into the slit of the winding needle, and in turn the combined material strip is clamped and fixed by the winding needle. Then, the cutting-off equipment cuts off the combined material strip passing between the first station and the second station, such that the cell on the winding needle at the second station is separated from the combined material strip, so as to facilitate the subsequent processing and unloading of the cell on the winding needle. And, since the combined material strip merged and formed by the merging equipment is located in the slit of the winding needle at the first station so that immediate winding of the next cell is possible, there is no need for the insertion of the cathode pole piece and the anode pole piece. That is to say, when the forming of a cell is completed, no more inserting action is required (that is, the starting ends of the cathode pole piece and the anode pole piece are inserted into the merging equipment), that is, immediate winding of the next cell is enabled, which greatly reduces the transition time between the two cells and increases production efficiency.

BRIEF DESCRIPTION OF THE DRAWINGS

In order to more clearly illustrate embodiments of the present disclosure or technical solutions in the prior art, accompanying drawings that need to be used in description of the embodiments or the prior art will be briefly introduced as follows. Obviously, drawings in following description are only the embodiments of the present disclosure. For those skilled in the art, other drawings can also be obtained according to the disclosed drawings without creative efforts.

DETAILED DESCRIPTION

The technical solutions in the embodiments of the present disclosure will be clearly and completely described below in conjunction with the accompanying drawings in the embodiments of the present disclosure. Obviously, the described embodiments are only a part of the embodiments of the present disclosure, and not all of them. Based on the embodiments in the present disclosure, all other embodiments obtained by a person of ordinary skill in the art without making creative labor fall within the scope of protection of the present disclosure.

In addition, terms "first" and "second" are only used for descriptive purposes, and should not be understood as indicating or implying relative importance or implying a number of indicated technical features. Therefore, features defined with "first", "second" may expressly or implicitly include at least one of those features. In the description of the present disclosure, "plurality" means at least two, such as two, three, etc., unless expressly and specifically defined otherwise.

In the present disclosure, unless otherwise expressly specified and limited, terms "mounted", "be connected with", "be connected to", "fixed" and other terms should be interpreted in a broad sense, for example, it can be a fixed connection, a detachable connection, or an integrated; it can be a mechanical connection or an electrical connection; it can be a direct connection or an indirect connection through an intermediate medium; it may be connection within the two elements or an interaction relationship between the two elements, unless explicitly defined otherwise. For those of ordinary skill in the art, the specific meanings of the above terms in the present disclosure can be understood according to specific situations.

Figure 1:
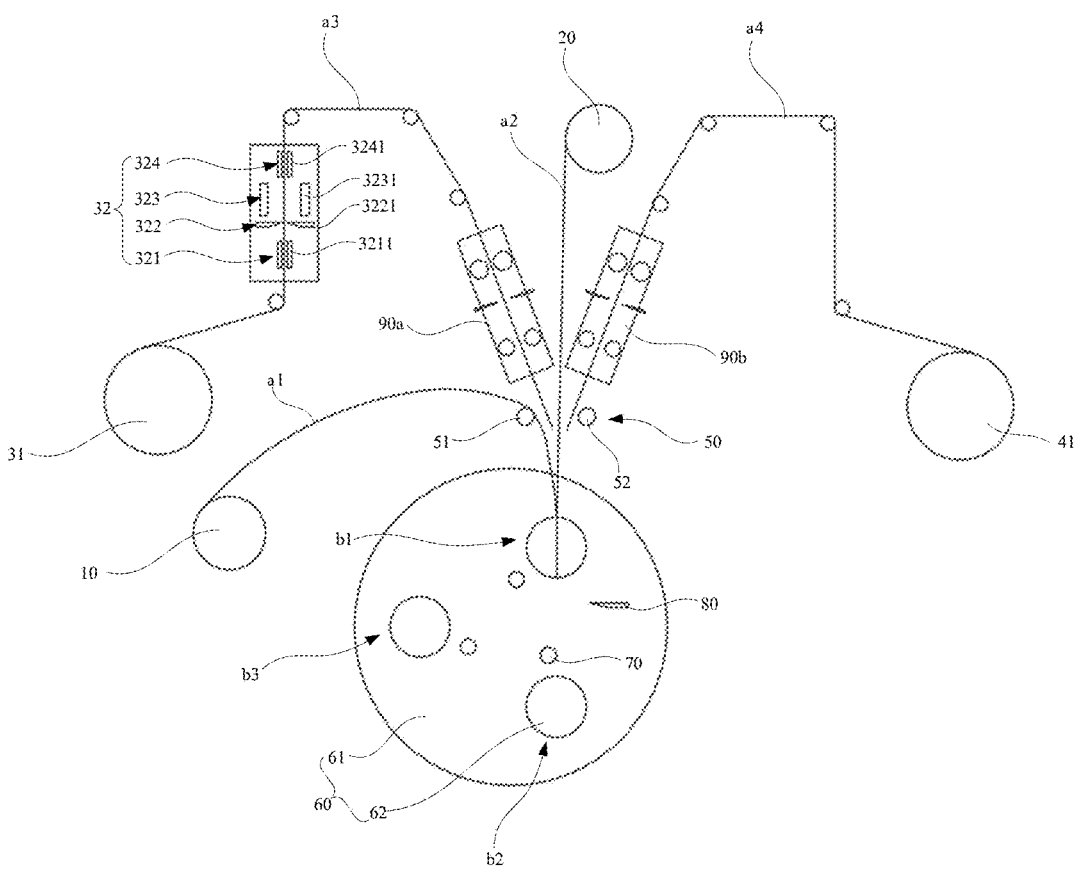
FIG. 1 is a schematic structural illustration of a winding device in an embodiment of the present disclosure.
Figure 2:
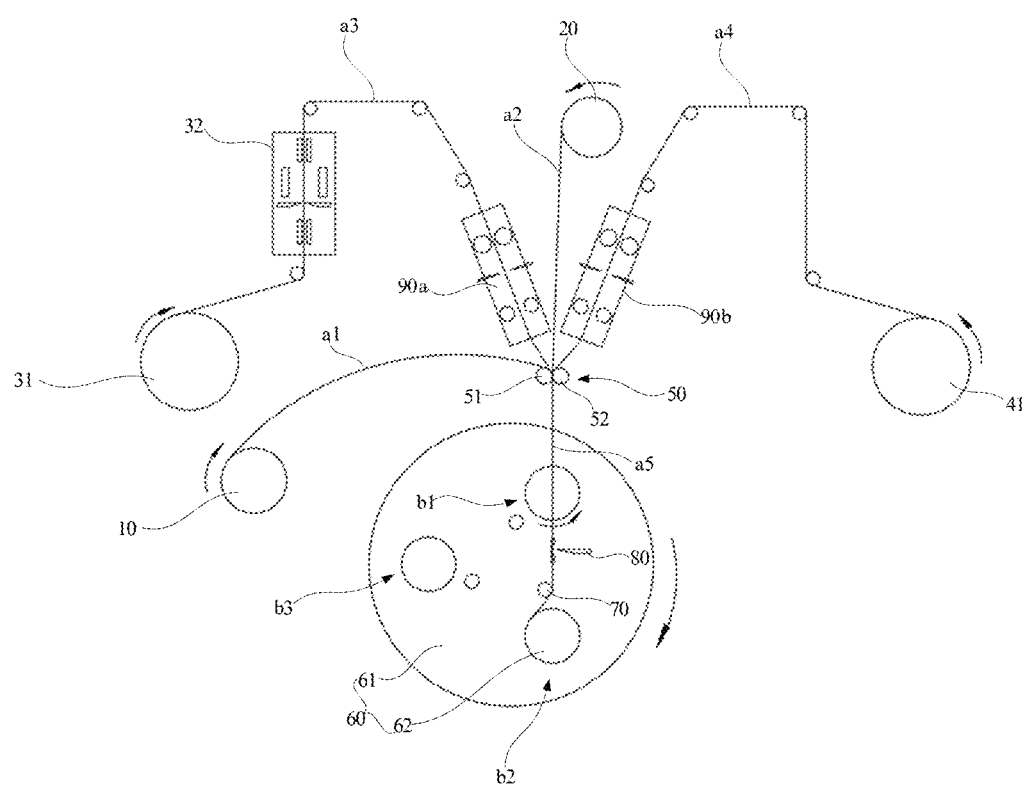
FIG. 2 is a schematic structural illustration of the winding device shown in FIG. 1 (the winding needle rotates from the first station to the second station after the winding of the cell is completed)

Referring to FIGS. 1 and 2, an embodiment of the present disclosure provides a winding device, which includes a first unwinding equipment 10, a second unwinding equipment 31, a third unwinding equipment 20, a fourth unwinding equipment 41, a first pole-piece-processing equipment 32, a merging equipment 50, a winding equipment 60, a guiding roller 70 and a cutting-off equipment 80. The first unwinding equipment 10 is used for outputting the first diaphragm a1 downstream, the second unwinding equipment 31 is used for outputting the cathode pole piece a3 downstream, the third unwinding equipment is used for outputting the second diaphragm a2 downstream, and the fourth unwinding equipment 41 is used for outputting the anode pole piece a4 downstream.

The merging equipment 50 is arranged downstream of the first unwinding equipment 10, the second unwinding equipment 31, the third unwinding equipment 20 and the fourth unwinding equipment 41, and is configured for merging the passing first diaphragm a1, the passing cathode pole piece a3, the passing second diaphragm a2 and the passing anode pole piece a4 to form a combined material strip a5. The first pole-piece-processing equipment 32 is arranged between the second unwinding equipment 31 and the merging equipment 50, so as to cut off the passing cathode pole piece a3, separate from each other the first upstream cut-off end d1 (see FIG. 3) and the first downstream cut-off end d2 (see FIG. 3) formed by cutting the cathode pole piece a3, and reconnect the first upstream cut-off end d1 and the first downstream cut-off end d2 of the cathode pole piece a3 with a tape. The tape between the first upstream cut-off end d1 and the first downstream cut d2 forms a first tape portion.

The winding equipment 60 includes a turret 61 and at least two winding needles 62 mounted on the turret 61, and each winding needle 62 can be extended or retracted relative to the turret 61. The turret 61 is rotatably provided, and the at least two winding needles 62 pass by the first station b1 and the second station b2 sequentially along with the rotation of the turret 61. The first station b1 is located downstream of the merging equipment 50, such that the combined material strip a5 merged by the merging equipment 50 is transported onto the winding needle 62 at the first station b1. The guiding roller 70 is arranged between the first station b1 and the second station b2, for the combined material strip a5 between the first station b1 and the second station b2 to wind through. The cutting-off equipment 80 is arranged between the first station b1 and the second station b2, so as to cut off the passing first diaphragm a1, the first tape portion on the passing cathode pole piece a3, the passing second diaphragm a2, and the passing anode pole piece a4 in one time.

Here, when one winding needle 62 located at the first station b1 rotates to the second station b2 along with the turret 61, the other winding needle 62 thereof rotates to the first station b1, and the combined material strip a5 located between the first station b1 and the second station b2 is wound onto the guiding roller 70, such that a slit on the winding needle 62 at the first station b1 is aligned with the combined material strip a5 passing by the first station b1, and such that when the winding needle 62 at the first station b1 extends, the combined material strip a5 passing by the first station b1 can enter into the slit of the winding needle 62 to be clamped and fixed, thereby facilitating subsequent winding.

In the above winding device, the first diaphragm a1, the cathode pole piece a3, the second diaphragm a2 and the anode pole piece a4, which are unwound and output by the first unwinding equipment 10, the second unwinding equipment 31, the third unwinding equipment 20 and the fourth unwinding equipment 41 respectively, are merged by the merging equipment 50 to form the combined material strip a5, and the combined material strip a5 formed after being merged reaches the winding needle 62 at the first station b1. The winding needle 62 at the first station b1 revolves on its axis to wind the combined material strip a5 to form a cell.

When winding of a cell is completed, the winding needle 62 at the first station b1 stops revolving on its axis and rotates to the second station b2 along with the turret 61, while the other winding needle 62 rotates to the first station b1 along with the turret 61. At this time, due to the rotation of the turret 61, the combined material strip a5 located between the first station b1 and the second station b2 is wound around the guiding roller 70. Under the guidance of the guiding roller 70, the combined material strip a5 passing by the first station b1 is aligned with the slit of the winding needle 62 at the first station b1. By controlling the winding needle 62 at the first station b1 to extend, the combined material strip a5 passing by the first station b1 is made to enter into the slit of the winding needle 62, and in turn the combined material strip a5 is clamped and fixed by the winding needle 62. Then, the cutting-off equipment 80 cuts off the combined material strip a5 passing between the first station b1 and the second station b2, such that the cell on the winding needle 62 at the second station b1 is separated from the combined material strip a5, so as to facilitate the subsequent processing and unloading of the cell on the winding needle 62. And, since the combined material strip a5 merged and formed by the merging equipment 50 is located in the slit of the winding needle 62 at the first station b1 so that immediate winding of the next cell is possible, there is no need for the insertion of the cathode pole piece a3 and the anode pole piece a4. That is to say, when the forming of a cell is completed, no more inserting action is required (that is, the starting ends of the cathode pole piece a3 and the anode pole piece a4 are inserted into the merging equipment 50), that is, immediate winding of the next cell is possible, which greatly reduces the transition time between the two cells and increases production efficiency.

It should be noted that before the cathode pole piece a3 enters into the merging equipment 50, the first pole-piece-processing equipment 32 first cuts off the passing cathode pole piece a3, then separates a first upstream cut-off end d1 and the first downstream cut-off end d2 formed by cutting off the cathode pole piece a3 from each other (i.e., they are separated from each other by a certain distance.), and then bonds the separated first upstream cut-off end d1 to the first downstream cut-off end d2 with a tape. The tape between the first upstream cut-off end d1 and the first downstream cut-off end d2 forms a first tape portion. In this way, the cutting-off equipment 80 cuts off the combined material strip a5 from the position of the tape, that is, cutting off the first diaphragm a1, the first tape portion on the cathode pole piece a3, the second diaphragm a2 and the anode pole piece a4. In addition, the first upstream cut-off end d1 and the first downstream cut-off end d2 of the cathode pole piece a3 formed upon cut-off of the combined material strip a5 are still wrapped by the tape, which prevents burrs of the first upstream cut-off end d1 and the first downstream cut-off end d2 from being exposed, and in turn prevents the burrs from adversely affecting the quality and safety of the cell, that is, contributing to improvement of the quality and safety of cell.

It also should be noted that inaccurate insertion position of a pole piece is easy to occur in the insertion, which seriously affects the quality of the cell. In the winding device of the present disclosure, there is no need to insert a pole piece between the forming of two cells, thereby avoiding inaccurate inserting position of the pole piece, and in turn contributes to improvement of the quality of cell. It should be understood that when unloading the cell on the winding needle 62, the winding needle 62 is retracted relative to the turret 61 so as to effect removal of the winding needle 62 from the cell.

It also should be noted that in a prefer embodiment, the merging equipment 50 may merge the first diaphragm a1, the cathode pole piece a3, the second diaphragm a2, and the anode pole piece a4 sequentially. In another embodiment, the merging equipment 50 may also merge the first diaphragm a1, the anode pole piece a4, the second diaphragm a2, and the cathode pole piece a3 sequentially.

In a specific embodiment, each winding needle has a first external needle, a first internal needle, a second external needle, and a second internal needle. The first external needle and the second external needle are oppositely provided, and side surfaces of them, which are opposite to each other, are combined to form an outer contour surface for winding the cell. The first internal needle is provided on one side of the first external needle facing the second external needle, the second internal needle is provided on one side of the second external needle facing the first external needle, the first internal needle and the second internal needle are used to form the above slit therebetween, and the first internal needle and the second internal needle move relative to each other to clamp the combined material strip a5 in the slit. It should be noted that, the extension of the winding needle means that the first external needle and the second external needle move in the axial direction thereof so that the combined material strip a5 enters into the slit between the first internal needle and the second internal needle. The retraction of the winding needle means that the first external needle and the second external needle move in opposite directions in the axial direction thereof so that the combined material strip a5 exits from the slit between the first internal needle and the second internal needle.

In the embodiment of the present disclosure, the first pole-piece-processing equipment 32 includes from upstream to downstream a first holding-transporting assembly 321, a first cutting assembly 322, a first gluing assembly 323 and a second holding-transporting assembly 324 disposed sequentially. Both the first holding-transporting assembly 321 and the second holding-transporting assembly 324 are used for clamping the passing cathode pole piece a3 and are capable of moving downstream. The first cutting assembly 322 is used for cutting off the passing cathode pole piece a3 and form the first upstream cut-off end d1 and the first downstream cut-off end d2. Here, during downstream moving of the first holding-transporting assembly 321 and the second holding-transporting assembly 324, the first upstream cut-off end d1 and the first downstream cut-off end d2 of the cathode pole piece a3 can be respectively driven to move to the first gluing assembly 323 and separated from each other. The first gluing assembly 323 is used for bonding the first upstream cut-off end d1 of the cathode pole piece a3 to the first downstream cut-off end d2 of the cathode pole piece a3 with the tape, such that the first upstream cut-off end d1 and the first downstream cut-off end d2 are connected by the tape.

In a specific embodiment, when the first holding-transporting assembly 321 and the second holding-transporting assembly 324 drive the first upstream cut-off end d1 and the first downstream cut-off end d2 of the cathode pole piece a3 respectively to move to the first gluing assembly 323, the second holding-transporting assembly 324 moves a distance greater than that the first holding-transporting assembly 321 moves, that is, the first downstream cut-off end d2 moves a distance greater than that the first upstream cut-off end d1 moves, so that the first upstream cut-off end d1 and the first downstream cut-off end d2 are separated from each other when they reach the first gluing assembly 323.

Figure 3:
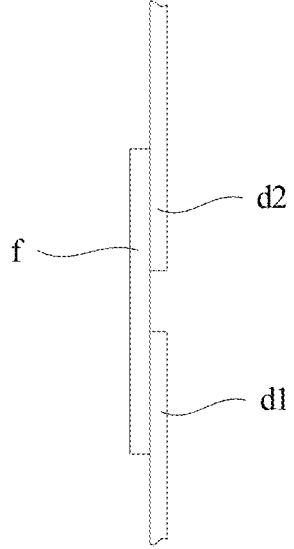
FIG. 3 is a schematic illustration of a gluing method of the first pole-piece-processing equipment of the winding device shown in FIG. 1.

Referring to FIG. 3, in a specific embodiment, the first gluing assembly 323 is used for bonding the first upstream cut-off end d1 to the first downstream cut-off d2 with the tape f from one side of the cathode pole piece a3, and thus, the first upstream cut-off end d1 and the first downstream cut-off end d2 of the cathode pole piece a3 are connected by the tape f bonded on a single side. After the first diaphragm a1, the cathode pole piece a3, the second diaphragm a2, and the anode pole piece a4 are merged by the merging equipment 50, the combined material strip a5 formed by merging is thinner at the first tape portion since the first tape portion of the cathode pole piece a3 has only one layer of tape, which facilitates cutting by the cutting-off equipment 80 and has a better cutting quality.

Figure 4:
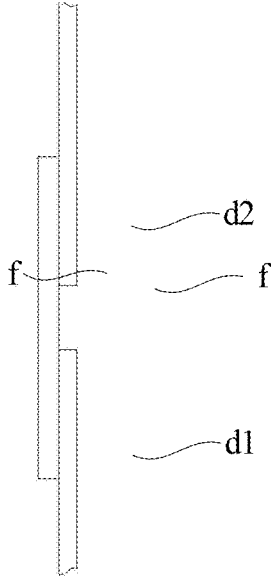
FIG. 4 is a schematic illustration of another gluing method of the first pole-piece-processing equipment of the winding device shown in FIG. 1.

Referring to FIG. 4, in another specific embodiment, the first gluing assembly 323 is used for to bonding the first upstream cut-off end d1 to the first downstream cut-off d2 with two tapes f from two sides of the cathode pole piece a3 respectively, and thus, the first upstream cut-off end d1 and the first downstream cut-off end d2 are connected by the two tapes f on both sides of the cathode pole piece a3, such that the first upstream cut-off end d1 and the first downstream cut-off end d2 are firmly connected. At this time, the first tape portion on the cathode pole piece a3 has two layers of tape.

Figure 5:
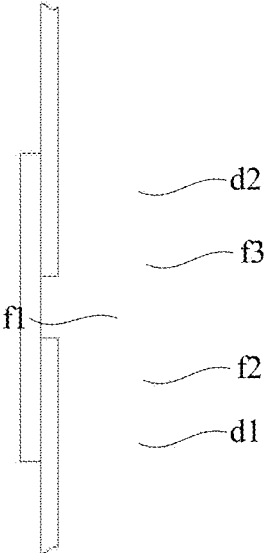
FIG. 5 is a schematic illustration of yet another gluing method of the first pole-piece-processing equipment of the winding device shown in FIG. 1.

Referring to FIG. 5, in yet another specific embodiment, the tape includes a first tape f1, a second tape f2, and a third tape f3. The first gluing assembly 323 is used for bonding the first upstream cut-off end d1 to the first downstream cut-off end d2 with the first tape f1 from a first side of the cathode pole piece a3, bonding the first upstream cut-off end d1 to the first tape f1 with the second tape f2 from a second side of the cathode pole piece a3, and bonding the first downstream cut-off end d2 to the first tape f1 with the third tape f3 from the second side of the cathode pole piece a3. Here, the first side and the second side of the cathode pole piece a3 face away from each other. The first tape portion is a portion of the first tape f located between the second tape f2 and the third tape f3, that is, the first tape portion has only one layer of tape. In this way, the first upstream cut-off end d1 and the first downstream cut-off end d2 are connected by one long tape (i.e., the first tape f1) and two short tapes (i.e., the second tape f2 and the third tape f3). On the one hand, the first upstream cut-off end d1 and the first downstream cut-off end d2 are firmly connected, and on the other hand, the position between the two short tapes on the cathode pole piece a3 in the combined material strip a5 formed by merging is thinner (i.e., the first tape portion is thinner), which facilitates the cutting-off equipment 80 to cut off the combined material strip a5 from the position between the two short tapes (i.e., cutting off the second tape portion) and ensure cutting quality.

Further, a side of the first tape f1 facing the cathode pole piece a3 includes sequentially a first gluing area, a non-gluing area, and a second gluing area. The first gluing area is bonded to the first downstream cut-off end d2, and the second gluing area is bonded to the first upstream cut-off end d1. One end of the third tape f3 is bonded to the first downstream cut-off end d2, and the other end is bonded to the first gluing area. One end of the second tape f3 is bonded to the first upstream cut-off end d1, and the other end is bonded to the second gluing area. In this way, the area between the second tape f2 and the third tape f3 and corresponding to the first tape f1 is the non-gluing area, so as to prevent the first tape f1 from being adhered to other elements during tape-running.

Continuing to FIGS. 1 and 2, in a specific embodiment, the first holding-transporting assembly 321 has two first clamping members 3211 disposed oppositely, which form a first holding-transporting passage therebetween for the cathode pole piece a3 to pass through. At least one of the two first clamping members 3211 can be controlled to get close to or away from the other one, so as to clamp or release the cathode pole piece a3.

In a specific embodiment, the second holding-transporting assembly 324 has two second clamping members 3241 disposed oppositely, which form a second holding-transporting passage therebetween for the cathode pole piece a3 to pass through. At least one of the two second clamping members 3241 can be controlled to get close to or away from the other one, so as to clamp or release the cathode pole piece a3.

In a specific embodiment, the first cutting assembly 322 has two first cutters 3221 disposed oppositely, which form a first cutting passage therebetween for the cathode pole piece a3 to pass through. One of the two first cutters 3221 can be controlled to get close to or away from the other one, so as to realize a cut-off action of cutting off the cathode pole piece a3. It should be noted that in other embodiments, the first cutting assembly 322 may have other configuration as long as it can cut off the cathode pole piece a3, for example, a structure of cutting the cathode pole piece a3 in the width direction of the cathode pole piece a3 with a cutter, which is not limited herein.

In a specific embodiment, the first gluing assembly 323 has two first tape-adsorbing members 3231 disposed oppositely, which form a first tape-bonding passage therebetween for the cathode pole piece a3 to pass through, and are both used for adsorbing the tape. It can be understood that when the tape is used on a single side, one of the first tape-adsorbing members 3231 adsorbs the tape, while the other first tape-adsorbing member 3231 does not adsorb the tape. When the tape is used at both sides, the two first tape-adsorbing members 3231 both adsorb the tape. When it is in a way of bonding the long tape to the short tape, one of the first tape-adsorbing members 3231 adsorbs one first tape f1, while the other first tape-adsorbing member 3231 adsorbs the second tape f2 and the third tape f3.

The two first tape-adsorbing members 3231 can be controlled to get close to or away from the other one, so as to bond the first upstream cut-off end d1 of the cathode pole piece a3 to the first downstream cut-off end d2 of the cathode pole piece a3 with the adsorbed tape.

Figure 6:
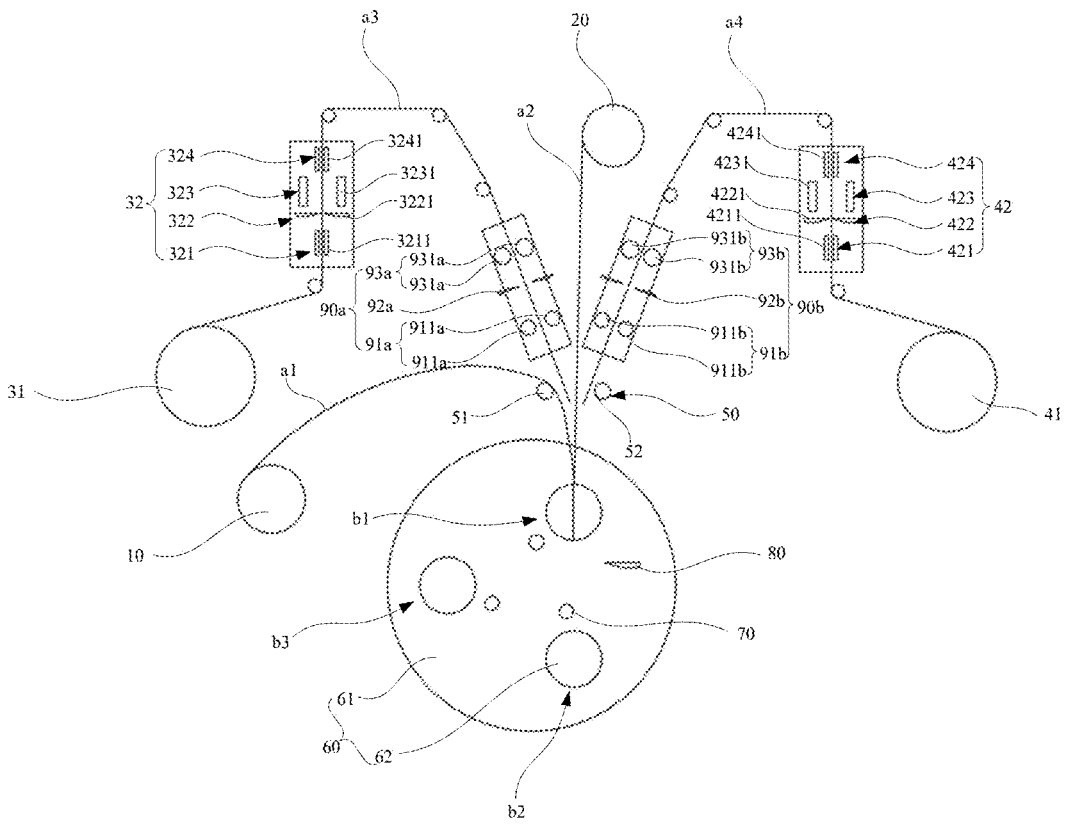
FIG. 6 is a schematic structural illustration of a winding device in another embodiment of the present disclosure.
Figure 7:
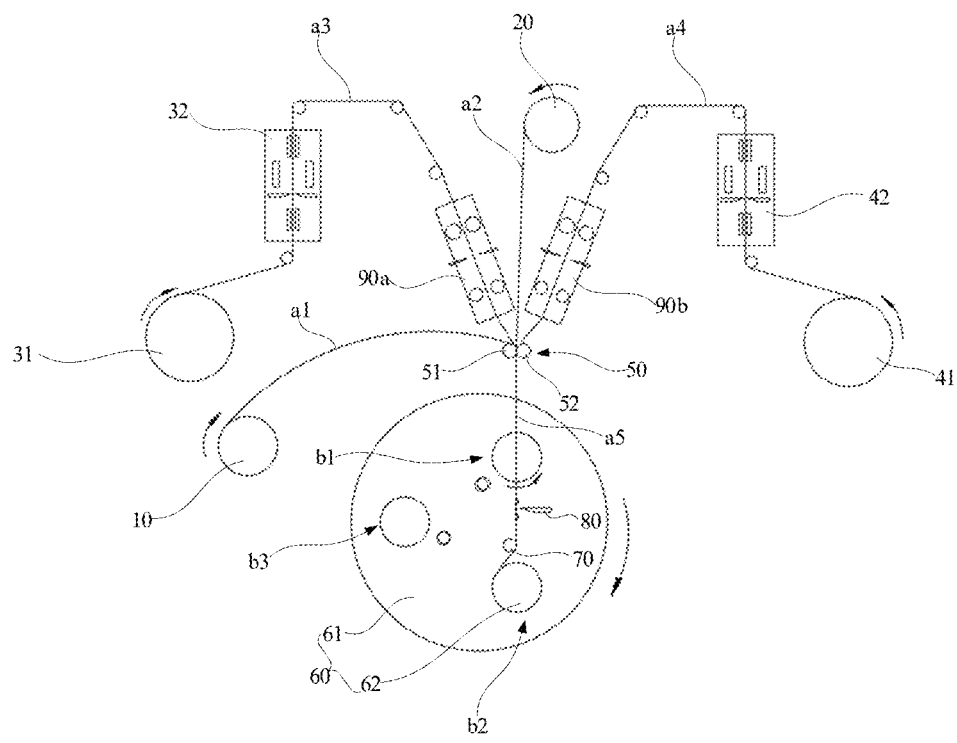
FIG. 7 is a schematic structural illustration of the winding device shown in FIG. 6 (the winding needle rotates from the first station to the second station after the winding of the cell is completed)

It should be noted that the winding device is not limited to cutting, separating, and re-gluing only the cathode pole piece a3. In other embodiments, the anode pole piece a4 can also be cut, separated, and re-glued. Referring to FIGS. 6-7, specifically, the winding device also includes a second pole-piece-processing equipment 42 arranged between the merging equipment 50 and the fourth unwinding equipment 41. The second pole-piece-processing equipment 42 is used for cutting off the passing anode pole piece a4, separating from each other a second upstream cut-off end d3 (see FIG. 8) and a second downstream cut-off end d4 (see FIG. 8) formed upon cut-off of the anode pole piece a4, and connecting the second upstream cut-off end d3 and the second downstream cut-off end d4 of the anode pole piece a4 by the tape. The tape between the second upstream cut-off end d3 and the second downstream cut-off end d4 forms a second tape portion. The cutting-off equipment 80 is used for cutting off the passing first diaphragm a1, the first tape portion on the passing cathode pole piece a3, the passing second diaphragm a2 and the second tape portion on the passing anode pole piece a4 in one time. The first upstream cut-off end d1 and the first downstream cut-off end d2 of the cathode pole piece a3 in the cut-off combined material strip a5 are still wrapped by the tape, and the second upstream cut-off end d3 and the second downstream cut-off end d4 of the anode pole piece a4 are still wrapped by the tape, which prevents burrs of the first upstream cut-off end d1, the first downstream cut-off end d2, the second upstream cut-off end d3 and the second downstream cut-off end d4 from being exposed, and in turn prevents the burrs from adversely affecting the quality and safety of the cell, that is, contributing to improvement of the quality and safety of cell.

It should be noted that in one embodiment, a spacing between the first upstream cut-off end d1 and the first downstream cut-off end d2 of the cathode pole piece a3 is a first spacing, and a spacing between the second upstream cut-off end d3 and the second downstream cut-off end d4 of the anode pole piece a4 is a second spacing. The first spacing is greater than the second spacing, so that at the end of winding the cell, the first upstream cut-off end d1 of the cathode pole piece a3 and the second upstream cut-off end d3 of the anode pole piece a4 are misaligned with each other, and the first upstream cut-off end d1 of the cathode pole piece a3 is wrapped by the anode pole piece a4.

In the present embodiment, the second pole-piece-processing equipment 42 includes from upstream to downstream a third holding-transporting assembly 421, a second cutting assembly 422, a second gluing assembly 423 and a fourth holding-transporting assembly 424 disposed sequentially. The third holding-transporting assembly 421 and the fourth holding-transporting assembly 424 are both used for clamping the passing anode pole piece a4 and are both capable of moving downstream. The second cutting assembly 422 is used for cutting off the passing anode pole piece a4 and form the above second upstream cut-off end d3 and the second downstream cut-off end d4. Here, during downstream moving of the third holding-transporting assembly 421 and the fourth holding-transporting assembly 424, the second upstream cut-off end d3 and the second downstream cut-off end d4 of the anode pole piece a4 can be respectively driven to move to the second gluing assembly 423 and separated from each other. The second gluing assembly 423 is used for bonding the second upstream cut-off end d3 of the anode pole piece a4 to the second downstream cut-off end d4 of the anode pole piece a4 with the tape, such that the second upstream cut-off end d3 and the second downstream cut-off end d4 are connected by the tape.

In a specific embodiment, when the third holding-transporting assembly 421 and the fourth holding-transporting assembly 424 respectively drive the second upstream cut-off end d3 and the second down stream cut-off end d4 of the anode pole piece a4 to move to the second gluing assembly 423, the fourth holding-transporting assembly 424 moves a distance greater than that the third holding-transporting assembly 421 moves, that is, the second downstream cut-off end d4 moves a distance greater than that the second upstream cut-off end d3 moves, so that when arriving at the second gluing assembly 423, the second upstream cut-off end d3 and the second down stream cut off-end d4 are spaced apart from each other.

Figure 8:
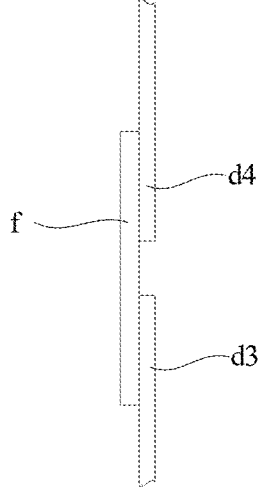
FIG. 8 is a schematic illustration of a gluing method of the second pole-piece-processing equipment of the winding device shown in FIG. 6.

Referring to FIG. 8, in a specific embodiment, the second gluing assembly 423 is used for bonding the second upstream cut-off end d3 to the second downstream cut-off end d4 with the tape f from one side of the anode pole piece a4, and thus, the second upstream cut-off end d3 and the second downstream cut-off end d4 of the anode pole piece a4 are connected by the tape f bonded on a single side. After the first diaphragm a1, the cathode pole piece a3, the second diaphragm a2, and the anode pole piece a4 are merged by the merging equipment 50, the combined material strip a5 formed by merging is thinner at the second tape portion since the second tape portion of the anode pole piece a4 has only one layer of tape, which facilitates cutting by the cutting-off equipment 80 and has a better cutting quality.

Figure 9:
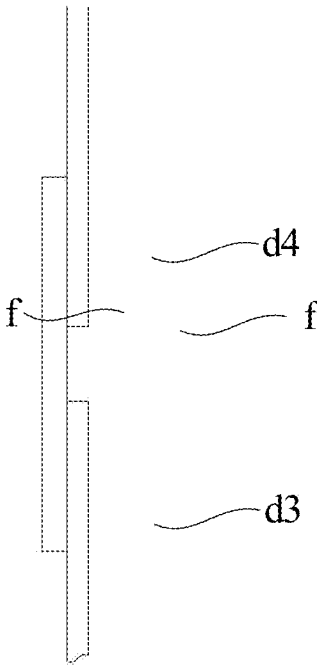
FIG. 9 is a schematic illustration of another gluing method of the second pole-piece-processing equipment of the winding device shown in FIG. 6.

Referring to FIG. 9, in another specific embodiment, the second gluing assembly 423 is used for bonding the second upstream cut-off end d3 to the second downstream cut-off end d4 with two tapes f from two sides of the anode pole piece a4 respectively, that is, the second upstream cut-off end d3 and the second downstream cut-off end d4 are connected by the two tapes f on both sides of the anode pole piece a4, such that the second upstream cut-off end d3 and the second downstream cut-off end d4 are firmly connected. At this time, the second tape portion on the anode pole piece a4 has two layers of tape.

Figure 10:
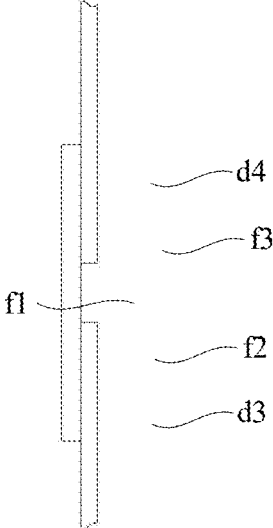
FIG. 10 is a schematic illustration of yet another gluing method of the second pole-piece-processing equipment of the winding device shown in FIG. 6.

Referring to FIG. 10, in yet another specific embodiment, the tape includes a first tape f1, a second tape f2, and a third tape f3. The second gluing assembly 423 is used for bonding the second upstream cut-off end d3 to the second downstream cut-off end d4 with the first tape f1 from a first side of the anode pole piece a4, bonding the second upstream cut-off end d3 to the first tape f1 with the second tape f2 from a second side of the anode pole piece a4, and bonding the second downstream cut-off end d4 to the first tape f1 with the third tape f3 from the second side of the anode pole piece a4. Here, the first side and the second sides of the anode pole piece a4 face away from each other. The second tape portion is a portion of the first tape f located between the second tape f2 and the third tape f3, that is, the second tape portion has only one layer of tape. In this way, the second upstream cut-off end d3 and the second downstream cut-off end d4 are connected by one long tape (i.e., the first tape f1) and two short tapes (i.e., the second tape f2 and the third tape f3). On the one hand, the second upstream cut-off end d3 and the second downstream cut-off end d4 are firmly connected, and on the other hand, the position between the two short tapes on the anode pole piece a4 in the combined material strip a5 is thinner (i.e., the second tape portion is thinner), which facilitates the cutting-off equipment 80 to cut off the combined material strip a5 from the position between the two short tapes (i.e., at the second tape portion) and ensure cutting quality.

Further, a side of the first tape f1 facing the anode pole piece a4 includes sequentially a first gluing area, a non-gluing area, and a second gluing area. The first gluing area is bonded to the second downstream cut-off end d4, and the second gluing area is bonded to the second upstream cut-off end d3. One end of the third tape f3 is bonded to the second downstream cut-off end d4, and the other end is bonded to the first gluing area. One end of the second tape f2 is bonded to the second upstream cut-off end d3, and the other end is bonded to the second gluing area. In this way, the area between the second tape f2 and the third tape f3 and corresponding to the first tape f1 is the non-gluing area, so as to prevent the first tape f1 from being adhered to other elements during tape-running.

Continuing to FIGS. 6 and 7, in a specific embodiment, the third holding-transporting assembly 421 has two third clamping members 4211 disposed oppositely, which form a third holding-transporting passage therebetween for the anode pole piece a4 to pass through. At least one of the two third clamping members 4211 can be controlled to get close to or away from the other one, so as to clamp or release the anode pole piece a4.

In a specific embodiment, the fourth holding-transporting assembly 424 has two fourth clamping members 4241 disposed oppositely, which form a fourth holding-transporting passage therebetween for the anode pole piece a4 to pass through. At least one of the two fourth clamping members 4241 can be controlled to get close to or away from the other one, so as to clamp or release the anode pole piece a4.

In a specific embodiment, the second cutting assembly 422 has two second cutters 4221 disposed oppositely, which form a second cutting passage therebetween for the anode pole piece a4 to pass through. One of the two second cutters 4221 can be controlled to get close to or away from the other one, so as to realize a cut-off action of cutting off the anode pole piece a4. It should be noted that in other embodiments, the second cutting assembly 422 may have other configuration as long as it can cut off the anode pole piece a4, for example, a structure of cutting the anode pole piece a4 in the width direction of the anode pole piece a4 with a cutter, which is not limited herein.

In a specific embodiment, the second gluing assembly 423 has two second tape-adsorbing members 4231 disposed oppositely, which form a second tape-bonding passage therebetween for the anode pole piece a4 to pass through, and are both used for adsorbing the tape. It can be understood that when the tape is used on a single side, one of the second tape-adsorbing members 4231 adsorbs the tape, while the other second tape-adsorbing member 4231 does not adsorb the tape. When the tape is used at both sides, the two second tape-adsorbing members 4231 both adsorb the tape. When it is in a way of bonding the long tape to the short tape, one of the second tape-adsorbing members 4231 adsorbs the first tape f1, while the other second tape-adsorbing member 4231 adsorbs the second tape f2 and the third tape f3.

The two second tape-adsorbing members 4231 can be controlled to get close to or away from the other one, so as to bond the second upstream cut-off end d3 of the anode pole piece a4 to the second downstream cut-off end d4 of the anode pole piece a4 with the adsorbed tape.

Referring to FIGS. 1 and 6, in the present embodiment, the winding device also includes a first feeding equipment 90a arranged between the merging equipment 50 and the first pole-piece-processing equipment 32. The first feeding equipment 90a includes a first feeding assembly 91a with two oppositely provided first feeding rollers 911a. The two first feeding rollers 911a forms a first feeding passage therebetween for the cathode pole piece a3 to pass through, and at least one of the two first feeding rollers 911a can be controlled to get close to or away from the other one, and can revolve on its axis. In this way, when it is necessary to perform a feeding operation (i.e., the starting end of the cathode pole piece a3 is sequentially passed through the merging equipment 50 and the slit of the winding needle 62 at the first station b1), the two first feeding rollers 911a are getting close to each other until the cathode pole piece a3 is clamped, and the two first feeding rollers 911a rotate around their own axes in opposite directions to each other, so that the cathode pole piece a3 is transported downstream until the starting end of the cathode pole piece a3 sequentially passes through the merging equipment 50 and the slit of the winding needle 62 at the first station b1.

It should be noted that one of the two first feeding rollers 911a is a driving roller and the other is a driven roller. When the two first feeding rollers 911a clamp the cathode pole piece a3, the driving roller is driven to rotate around its own axis so as to drive the driven roller to rotate reversely around its own axis (for example, when the driving roller rotates clockwise, the driven roller rotates counterclockwise), causing the cathode pole piece a3 to pass through the first feeding passage and move downstream, and in turn pass through the merging equipment 50 and the slit of the winding needle 62 at the first station b1 sequentially. Of course, in other embodiments, the two first feeding rollers 911a may also be driving rollers, as long as it is possible to transport the cathode pole piece a3 downstream and pass through the merging equipment 50 and the slit of the winding needle 62 at the first station b1, which is not limited herein.

Further, the two first feeding rollers 911a of the first feeding assembly 91a can be controlled to move along their own axes, so as to drive the cathode pole piece a3 clamped by the two first feeding rollers 911a for alignment.

In a specific embodiment, the first feeding equipment 90a further includes a first holding assembly 93a and a first cut-off assembly 92a. The first holding assembly 93a is arranged upstream of the first feeding assembly 91a, and the first cut-off assembly 92a is arranged between the first holding assembly 93a and the first feeding assembly 91a.

The first holding assembly 93a is used for clamping or releasing the passing cathode pole piece a3, and can be controlled to get close to or away from the first cut-off assembly 92a, and the first cut-off assembly 92a is used for cutting off the passing cathode pole piece a3. In this way, when a feeding operation is required, the first holding assembly 93a clamps the passing cathode pole piece a3 and moves toward the first cut-off assembly 92a, such that the starting end of the cathode pole piece a3 penetrates into the first cut-off assembly 92a. The first cut-off assembly 92a is then used to cut off the cathode pole piece a3 to remove the scrap section of the starting end of the cathode pole piece a3. The first holding assembly 93a then continues moving toward the first cut-off assembly 92a, such that the starting end of the cathode pole piece a3 passes through the first cut-off assembly 92a and the first feeding passage of the first feeding assembly 91a sequentially. Then, the two first feeding rollers 911a of the first feeding assembly 91a clamp the cathode pole piece a3, and the first holding assembly 93a releases the cathode pole piece a3 and returns to the initial position. The two first feeding rollers 911a move along the axial direction thereof for alignment, and then rotate in opposite directions after being aligned to the proper position, so as to drive the cathode pole piece a3 to move downstream, until the starting end of the cathode pole piece a3 passes through the merging equipment 50 and the slit of the winding needle 62 at the first station b1 sequentially, thereby completing the feeding operation.

More specifically, the first holding assembly 93a has two first holding members 931a provided oppositely, which form a first holding passage therebetween for the cathode pole piece a3 to pass through, and at least one of which can be controlled to get close to or away from the other one, so as to clamp or release the cathode pole piece a3 in the first holding passage.

More specifically, the first cut-off assembly 92a has two third cutters disposed oppositely, which form a third cutting passage therebetween for the cathode pole piece a3 to pass through, and at least one of which can be controlled to get close to or away from the other one, so as to cut the cathode pole piece a3 in the third cutting passage. It should be noted that in other embodiments, the first cut-off assembly 92a may also adopt other types of cutting configuration as long as the cathode pole piece a3 can be cut off, which is not limited herein.

In the present embodiment, the winding device also includes a second feeding equipment 90b arranged between the merging equipment 50 and the second pole-piece-processing equipment 42. The second feeding equipment 90b includes a second feeding assembly 91b with two second feeding rollers 911b disposed oppositely. The two second feeding rollers 911b form a second feeding passage therebetween for the anode pole piece a4 to pass through, and at least one of the two second feeding rollers 911b can be controlled to get close to or away from the other one, and both can rotate around its own axis. In this way, when the feeding operation is required (i.e., the starting end of the anode pole piece a4 passes through the merging equipment 50 and the slit of the winding needle 62 at the first station b1 sequentially), the two second feeding rollers 911b are getting close to each other until the anode pole piece a4 is clamped, and the two second feeding rollers 911b rotate in opposite directions about their axes to each other, so as to transport the anode pole piece a4 downstream until the starting end of the anode pole piece a4 passes through the merging equipment 50 and the slit of the winding needle 62 at the first station b1 sequentially.

It should be noted that one of the two second feeding rollers 911b is a driving roller, and the other is a driven roller. When the two second feeding rollers 911b clamp the anode pole piece a4, the driving roller is driven to rotate around its own axis so as to drive the driven roller to rotate reversely around its own axis (for example, when the driving roller rotates clockwise, the driven roller rotates counterclockwise), thereby driving the anode pole piece a4 to move downstream through the second feeding passage and finally pass through the merging equipment 50 and the slit of the winding needle 62 at the first station b1 sequentially. Of course, in other embodiments, both of the second feeding rollers 911b may be driving rollers, as long as the anode pole piece a4 can be transported downstream and passes through the merging equipment 50 and the slit of the winding needle 62 at the first station b1, which is not limited herein.

Further, the two second feeding rollers 911b of the second feeding assembly 91b can be controlled to move along their own axes, so as to drive the anode pole piece a4 clamped by the two second feeding rollers 911b for alignment.

In a specific embodiment, the second feeding equipment 90b further includes a second holding assembly 93b and a second cut-off assembly 92b. The second holding assembly 93b is arranged upstream of the second feeding assembly 91b, and the second cut-off assembly 92b is arranged between the second holding assembly 93b and the second feeding assembly 91b. The second holding assembly 93b is used for clamping or releasing the passing anode pole piece a4, and can be controlled to get close to or away from the second cut-off assembly 92b, and the second cut-off assembly 92b is used for cutting off the passing anode pole piece a4. In this way, when a feeding operation is required, the second holding assembly 93b clamps the passing anode pole piece a4 and moves toward the second cut-off assembly 92b, such that the starting end of the anode pole piece a4 penetrates into the second cut-off assembly 92b. The second cut-off assembly 92b is then used to cut off the anode pole piece a4 to remove the scrap section of the starting end of the anode pole piece a4. The second holding assembly 93b then continues moving toward the second cut-off assembly 92b, such that the starting end of the anode pole piece a4 passes through the second cut-off assembly 92b and the second feeding passage of the second feeding assembly 9 lb sequentially. Then, the two second feeding rollers 911b of the second feeding assembly 91b clamp the anode pole piece a4, and the second holding assembly 93b releases the anode pole piece a4 and returns to the initial position. The two second feeding rollers 911b move along the axial direction thereof for alignment, and then rotate in opposite directions after being aligned to the proper position, so as to drive the anode pole piece a4 to continue moving downstream, until the starting end of the anode pole piece a4 passes through the merging equipment 50 and the slit of the winding needle 62 at the first station b1 sequentially, thereby completing the feeding operation.

More specifically, the second holding assembly 93b has two second holding members 93 lb provided oppositely, which form a second holding passage therebetween for the anode pole piece a4 to pass through, and at least one of which can be controlled to get close to or away from the other one, so as to clamp or release the anode pole piece a4 in the second holding passage.

More specifically, the second cut-off assembly 92b has two fourth cutters disposed oppositely, which form a fourth cutting passage therebetween for the anode pole piece a4 to pass through, and at least one of which can be controlled to get close to or away from the other one, so as to cut off the anode pole piece a4 in the fourth cutting passage. It should be noted that in other embodiments, the second cut-off assembly 92*b* may also adopt other types of cutting configuration as long as the anode pole piece a4 can be cut off, which is not limited herein.

Continuing to FIGS. 1 and 2, in the present embodiment, the merging equipment 50 has a first merging roller 51 and a second merging roller 52 disposed oppositely, which form a merging passage therebetween for the first diaphragm a1, the cathode pole piece a3, the second diaphragm a2, and the anode pole piece a4 to pass through. At least one of the first merging roller 51 and the second merging roller 52 can be controlled to get close to or away from the other one, and each of the first merging roller 51 and the second merging roller 52 is rotatable about its own axis. In this way, initially, the first diaphragm a1 and the second diaphragm a2 output by the first unwinding equipment 10 and the third unwinding equipment 20 sequentially pass through the merging passage and the slit of the winding needle 62 at the first station b1. The first feeding equipment 90*a* and the second feeding equipment 90*b* respectively enable the starting ends of the cathode pole piece a3 and the anode pole piece a4 to penetrate into the merging passage. The first merging roller 51 and the second merging roller 52 get close to each other so as to clamp the first diaphragm a1, the cathode pole piece a3, the second diaphragm a2 and the anode pole piece a4, such that the first diaphragm a1, the cathode pole piece a3, the second diaphragm a2, and the anode pole piece a4 are merged to form the combined material strip a5. At this time, the winding needle 62 at the first station b1 revolves on its own axis, and under the frictional force of the first diaphragm a1 and the second diaphragm a2, the cathode pole piece a3 and the anode pole piece a4 are driven to move along with the first diaphragm a1 and the second diaphragm a2, and then are wound on the winding needle 62, that is, realizing winding of the cell.

Of course, in other embodiments, the first merging roller 51 and the second merging roller 52 get close to each other to a position where there is a certain gap between them, and do not tightly press against the first diaphragm a1, the cathode pole piece a3, the second diaphragm a2 and the anode pole piece a4 as long as the first diaphragm a1, the cathode pole piece a3, the second diaphragm a2 and the anode pole piece a4 are merged such that the combined material strip a5 can enter into the slit of the winding needle 62 at the first station b1 smoothly, which is not limited herein. At this time, the feeding operation is performed not depending on the frictional force between the first diaphragm a1 and the second diaphragm a2, such that the starting ends of the cathode pole piece a3 and the anode pole piece a4 sequentially pass through the merging passage and the slit of the winding needle 62 at the first station b1; but depending on downstream transporting of the cathode pole piece a3 and the anode pole piece a4 by means of the first feeding assembly 91*a* and the second feeding assembly 91*b* respectively such that the starting ends of the cathode pole piece a3 and the anode pole piece a4 sequentially pass through the merging passage and the slit of the winding needle 62 at the first station b1.

In the embodiment of the present disclosure, the turret 61 is mounted with three winding needles 62 disposed at intervals in the rotational direction of the turret 61. The winding equipment 60 also has a third station b3, and the three winding needles 62 sequentially pass by the first station b1, the second station b2, and the third station b3 along with the rotating of the turret 61. And, when one of the winding needles 62 is located at the first station b1, the other two winding needles 62 are located at the second station b2 and the third station b3, respectively. As an embodiment, the first station b1 is a winding station, that is, the winding needle 62 at the first station b1 revolves on its axis to wind and form a cell; the second station b2 is a gluing station, that is, a tail tape is bonded onto the cell on the winding needle 62 at the second station b2 so as to prevent the cell from releasing; the third station b3 is a unloading station, that is, being used for unloading the cell on the winding needle 62 at the third station b3.

In a specific embodiment, three guiding rollers 70 are also included and are all mounted on the turret 61 to rotate along with the turret 61, and each guiding roller 70 is located between two adjacent winding needles 62, such that each time one of the winding needles 62 arrives at the first station b1, one of the guiding rollers 70 must arrive at a position between the first station b1 and the second station b2 for the combined material strip a5 between the first station b1 and the second station b2 to wind through, that is, guiding the combined material strip a5, such that when the winding needle 62 arriving at the first station b1 extends, the combined material strip a5 can enter into the slit of the winding needle 62.

It should be noted that in other embodiments, only the first station b1 and the second station b2 are included, and only two winding needles 62 may be mounted on the turret 61. At this time, the first station b1 is the winding station, and the second station b2 is the unloading station.

The technical features of the above embodiments can be combined arbitrarily. In order to simplify the description, all possible combinations of the technical features in the above embodiments are not described. However, as long as there is no contradiction in the combination of these technical features, it should be considered as a scope of this description.

The above embodiments only express several embodiments of the present disclosure, and the description is more specific and detailed, but it cannot be understood as a limitation on the scope of the present disclosure. It should be noted that for those skilled in the art, several modifications and improvements can be made without departing from a concept of the present disclosure, which belong to a protective scope of the present disclosure. Therefore, the protective scope of the present disclosure shall be subject to the appended claims.

The invention claimed is:

1. A winding device, comprising:
a first unwinding equipment, a second unwinding equipment, a third unwinding equipment, and a fourth unwinding equipment, respectively configured for outputting a first diaphragm, a cathode pole piece, a second diaphragm, and an anode pole piece;
a merging equipment, arranged downstream of the first unwinding equipment, the second unwinding equipment, the third unwinding equipment, and the fourth unwinding equipment, and configured for merging the first diaphragm, the cathode pole piece, the second diaphragm, and the anode pole piece as they pass through the merging equipment, so as to form a combined material strip;
a first pole-piece-processing equipment, arranged between the second unwinding equipment and the merging equipment, configured for cutting off the cathode pole piece as it passes through the first pole-piece-processing equipment, separating from each other a first upstream cut-off end and a first downstream cut-off end both formed upon cut-off of the cathode pole piece, and connecting the first upstream cut-off end and the first downstream cut-off end with a tape; the tape between the first upstream cut-off end and the first downstream cut-off end forming a first tape portion;

a winding equipment, comprising a turret and at least two winding needles which comprises a first winding needle and a second winding needle and are mounted on the turret, the turret rotatably provided so as to drive each of the at least two winding needles to pass by a first station and a second station sequentially, and the first station located downstream of the merging equipment; and a guiding roller and a cutting-off equipment, both arranged between the first station and the second station, the cutting-off equipment configured for cutting off the first diaphragm, the first tape portion on the cathode pole piece, the second diaphragm, and the anode pole piece together as they pass through the cutting-off equipment;

wherein, when the first winding needle located at the first station rotates to the second station along with the turret, the second winding needle rotates to the first station, and the combined material strip, which is located between the first station and the second station, winds through the guiding roller; the guiding roller positioning the combined strip to enable one of the at least two winding needles located at the first station to hold the combined material strip, wherein the first pole-piece-processing equipment comprises from upstream to downstream a first holding-transporting assembly, a first cutting assembly, a first gluing assembly, and a second holding-transporting assembly disposed sequentially;

both the first holding-transporting assembly and the second holding-transporting assembly are configured for holding the cathode pole piece upon passing therethrough, the first cutting assembly being configured for cutting off the cathode pole piece upon passing through the first cutting assembly, and the cut off cathode pole piece forming a first upstream cut-off end and a first downstream cut-off end;

wherein the first holding-transporting assembly and the second holding-transporting assembly are configured to move downstream at the same time to drive the first upstream cut-off end and the first downstream cut-off end respectively to move from the cutting assembly to the first gluing assembly, while separating the first upstream cut-off end and the first downstream cut-off end from each other, and the first gluing assembly is configured for bonding the first upstream cut-off end to the first downstream cut-off end with the tape.

2. The winding device of claim 1, wherein when the first holding-transporting assembly and the second holding-transporting assembly drive the first upstream cut-off end and the first downstream cut-off end, respectively to move to the first gluing assembly, the second holding-transporting assembly moves a distance greater than that the first holding-transporting assembly moves.

3. The winding device of claim 1, wherein the first gluing assembly is configured to bond the tape to one side of the first upstream cut-off end and the first downstream cut-off end.

4. The winding device of claim 1, wherein the first gluing assembly is configured to bond the tape to both sides of the first upstream cut-off end and the first downstream cut-off end.

5. The winding device of claim 1, wherein the tape comprises a first tape, a second tape, and a third tape, the first gluing assembly is configured to bond the first tape to a first side of the first upstream cut-off end and the first downstream cut-off end, bond the second tape to a second side of the first upstream cut-off end and the first tape, and bond the third tape to a second side of the first downstream cut-off end and the first tape.

6. The winding device of claim 1, wherein the winding device further comprises a second pole-piece-processing equipment arranged between the merging equipment and the fourth unwinding equipment, the second pole-piece-processing equipment is configured for cutting off the anode pole piece as it passes through the second pole-piece-processing equipment, to separating from each other a second upstream cut-off end and a second downstream cut-off end both formed upon cut-off of the anode pole piece, and connecting the second upstream cut-off end and the second downstream cut-off end by the anode tape; the anode tape between the second upstream cut-off end and the second downstream cut-off end forms a second tape portion;

the cutting-off equipment is configured for cutting off the first diaphragm, the first tape portion on the cathode pole piece, the second diaphragm, and a second tape portion on the anode pole piece together as they pass through the cutting-off equipment.

7. The winding device of claim 6, characterized in that wherein the second pole-piece-processing equipment comprises from upstream to downstream a third holding-transporting assembly, a second cutting assembly, a second gluing assembly, and a fourth holding-transporting assembly disposed sequentially;

both the third holding-transporting assembly and the fourth holding-transporting assembly are configured for holding the anode pole piece as it passes through them, the second cutting assembly being configured for cutting off the anode pole piece as it passes through the second cutting assembly, and the cut off anode pole piece forming the second upstream cut-off end and the second downstream cut-off end;

wherein, the third holding-transporting assembly and the fourth holding-transporting assembly are configured to move downstream at the same time to drive the second upstream cut-off end and the second downstream cut-off end respectively to move from the cutting assembly to the second gluing assembly, while separating the second upstream cut-off end and the second downstream cut-off end from each other, and the second gluing assembly is configured for bonding the second upstream cut-off end to the second downstream cut-off end with the anode tape.

8. The winding device of claim 7, wherein when the third holding-transporting assembly and the fourth holding-transporting assembly drive the second upstream cut-off end and the second downstream cut-off end, respectively to move to the second gluing assembly, the fourth holding-transporting assembly moves a distance greater than that the third holding-transporting assembly moves.

9. The winding device of claim 7, wherein the second gluing assembly is configured to bond the anode tape to one side of the second upstream cut-off end and the second downstream cut-off end.

10. The winding device of claim 7, wherein the second gluing assembly is configured to bond the anode tape to both sides of the second upstream cut-off end and the second downstream cut-off end.

11. The winding device of claim 7, wherein the tape comprises a first anode tape, a second anode tape and a third anode tape, the second gluing assembly is configured to bond the first anode tape to a first side of the second upstream cut-off end and the second downstream cut-off end with the first anode tape from a first side of the cathode pole piece, bond the second anode tape to a second side of the second upstream cut-off end and the first anode tape with the second anode tape from a second side of the cathode pole piece, and bond the third anode tape to a second side of the second downstream cut-off end and the first anode tape.

12. The winding device of claim 1, wherein the winding device further comprises a first feeding equipment arranged between the merging equipment and the first pole-piece-processing equipment;

the first feeding equipment comprises a first feeding assembly having two first feeding rollers provided oppositely, the two first feeding rollers forming a first feeding passage therebetween for the cathode pole piece to pass through, and at least one of the two first feeding rollers is configured to be controlled to get close to or away from the other one and each is configured to rotate around its own axis.

13. The winding device of claim 12, wherein both of the two first feeding rollers are configured to be controlled to move along their own axes so as to drive the cathode pole piece clamped by the two first feeding rollers for alignment.

14. The winding device of claim 12, wherein the first feeding equipment further comprises a first holding assembly arranged upstream of the first feeding assembly, and a first cut-off assembly arranged between the first holding assembly and the first feeding assembly; the first holding assembly is configured for clamping or releasing the cathode pole piece as it passes through the first holding assembly, and configured to be controlled to get close to or away from the first cut-off assembly, and the first cut-off assembly is configured for cutting off the cathode pole piece as it passes through the first cut-off assembly.

15. The winding device of claim 1, wherein the winding device further comprises a second feeding equipment arranged between the merging equipment and the fourth unwinding equipment;

the second feeding equipment comprises a second feeding assembly having two second feeding rollers provided oppositely, the two second feeding rollers forming a second feeding passage therebetween for the anode pole piece to pass through, and at least one of the two second feeding rollers is configured to be controlled to get close to or away from the other one and each is configured to rotate around its own axis.

16. The winding device of claim 15, wherein both of the two second feeding rollers is configured to be controlled to move along their own axes so as to drive the anode pole piece clamped by the two second feeding rollers for alignment.

17. The winding device of claim 15, wherein the second feeding equipment further comprises a second holding assembly arranged upstream of the second feeding assembly, and a second cut-off assembly arranged between the second holding assembly and the second feeding assembly;

the second holding assembly is configured for clamping or releasing the anode pole piece as it passes through the second holding assembly, and is configured to be controlled to get close to or away from the second cut-off assembly, and the second cut-off assembly is configured for cutting off the anode pole piece as it passes through the second cut-off assembly.

18. The winding device of claim 1, wherein the merging equipment has a first merging roller and a second merging roller arranged oppositely, the first merging roller and the second merging roller forming a merging passage therebetween for the first diaphragm, the cathode pole piece, the second diaphragm, and the anode pole piece to pass through; at least one of the first merging roller and the second merging roller is configured to controlled to get close to or away from the other one, and each is configured to rotate around its own axis.

19. The winding device of claim 1, wherein the turret is mounted with three winding needles disposed at intervals in a rotating direction of the turret; the winding equipment further has a third station, and during rotating along with the turret, the three winding needles pass by the first station, the second station, and the third station sequentially; when one of the winding needles is located at the first station, the other two winding needles are respectively located at the second station and the third station;

wherein there are provided three guiding rollers, and there are provided with the guiding roller between each adjacent two winding needles.

* * * * *